Oct. 8, 1935.                H. G. SMITH                2,016,346
                          MEASURING DEVICE
                         Filed Sept. 5, 1934

INVENTOR
Hale G. Smith
BY Warfield & Brown
ATTORNEYS

Patented Oct. 8, 1935

2,016,346

UNITED STATES PATENT OFFICE 2,016,346

MEASURING DEVICE

Hale G. Smith, Jackson Heights, N. Y., assignor to Aerial Explorations Inc., New York, N. Y., a corporation of New Jersey Application September 5, 1934, Serial No. 742,711

4 Claims. (Cl. 33—121)

This invention relates to measuring devices and methods for making the same and more specifically to devices for measuring areas.

In general it is an object of the invention to provide a device of the character described which will efficiently perform the purposes for which it is intended, which is simple and economical of construction, and which can be expeditiously and conveniently manipulated, and to provide a method for readily manufacturing and assembling the same.

Another object of the invention is to provide a device for measuring areas, which device has no relatively movable parts.

Another object is to provide an area-measuring device which may be produced, and reproduced on various scales, by practically a single photographic process.

Another object is to provide an area-measuring device which, when applied to a map, reads directly, in acres for example, the area represented by a predetermined portion of said map.

The invention accordingly comprises the several steps and the relation of one or more of such steps with respect to each of the others, and the article possessing the features, properties, and the relation of elements, which are exemplified in the following detailed disclosure, and the scope of the application of which will be indicated in the claims.

Figure 1:
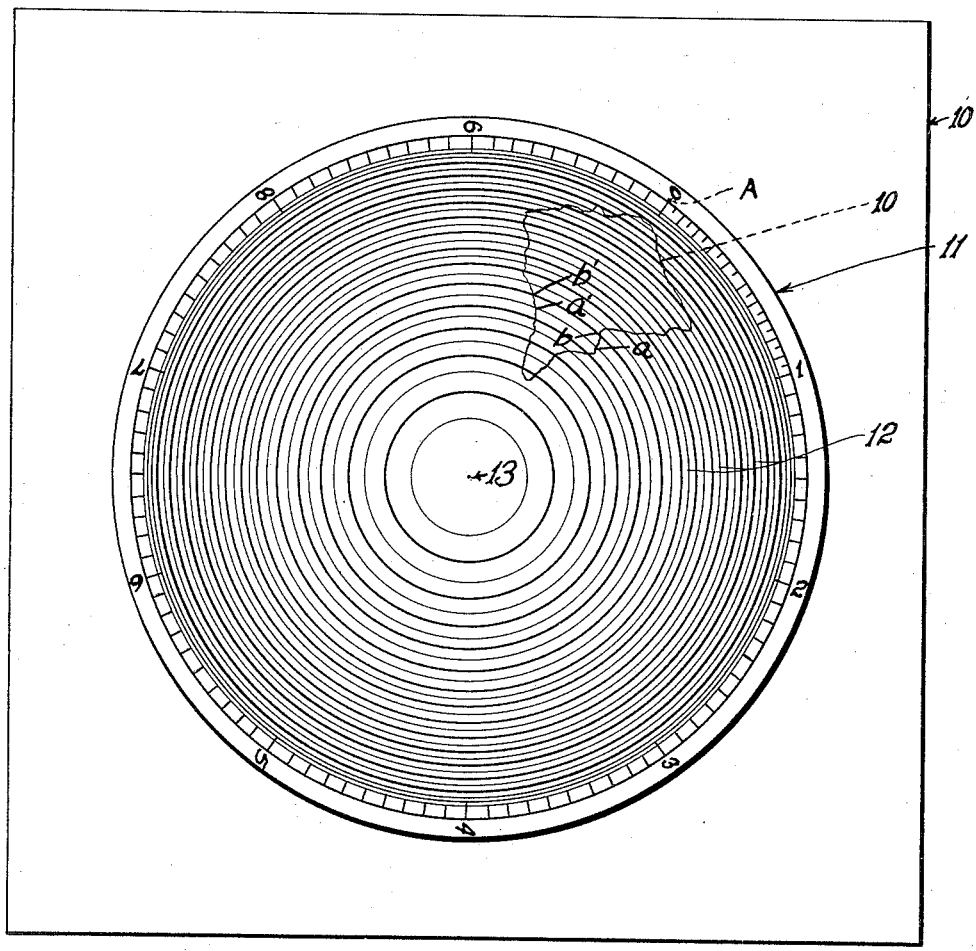
Figure 2:
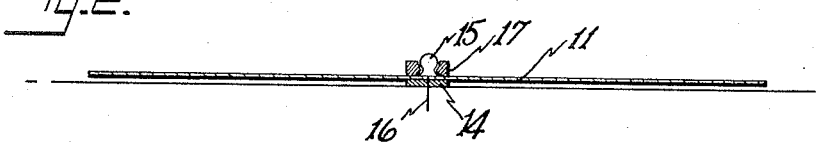

For a fuller understanding of the nature and objects of the invention reference should be had to the following detailed description taken in connection with the accompanying drawing, in which:

Fig. 1 is a plan view of a device embodying one form of the invention, said device being superimposed upon an area to be measured; and Fig. 2 is a cross section in elevation of the device illustrated in Fig. 1 and shown with supporting and handle means.

In the drawing 10 denotes an area to be measured. The area may be in a map 10' or photograph or any other similar device. 11 is a sheet of transparent and preferably flexible material having concentric circles 12 marked thereon. The radii of the circles are such as to give the successive annuli between the circles areas which differ by a constant amount. For example, if the first or innermost circle encompasses an area of one square inch, the second circle encloses an area of two square inches, and the third an area of three square inches. The annulus between the first and second circle, and the annulus between the second and third circle, have each an area of one square inch. The sheet 11 with the circles thereon may be used as a planimeter. In order to measure the area 10, the center of the circles 12 may be placed anywhere. The more circles which the periphery of the area 10 cuts, the more accurate the determination of the numerical value of the area 10 will be in general. The center of the circles may be held in position by any convenient means such as a pin pressed through a small hole 13 at the center. The sheet 11 is then rotated about the center so that the point $a$ on the smallest circle which cuts the area moves from its position above the periphery of the area on one side to a point $a'$ where it will be in registry with the periphery of the area on the opposite side. To accomplish this motion of the sheet 11, a sharp pointed instrument may be applied against the sheet 11 at the point $a$ and used as a pushing element to push the point $a$ to the point $a'$. Thereafter the instrument may be placed at the point $b$ and the sheet rotated until the point $b$ reaches the point $b'$. The point $a$ will by this latter motion be moved completely away from the area 10. The same procedure is followed with each of the circles which intersects the area to be measured.

Certain indicia may be provided around the periphery of the outermost circle. As shown the outermost circle is divided into 10 successive equal arcs and the numbers 1 to 10 are provided respectively adjacent the successive ends of the said arcs. Before the sheet is first rotated the zero point of the indicia will be in registry with some point A on the map which contains the area. After the rotation of the transparent sheet has been completed, the point A will be adjacent some point of the indicia such as the point 2. This means that the sheet 11 has been turned through 2/10ths of a complete circle, and that the area being measured is equal to 2/10ths of the area included in any one annulus. If the inner circle is equal to one square inch, the area being measured is thus found to be equal to 2/10ths of one square inch.

In the rotation of the sheet 11 it is immaterial which circle is moved first from one side to the other of the area to be measured. It is only necessary that before the operation is completed all of the circles cutting the area shall have been moved from one side of the area to the other in the same direction.

Depending upon what the area of any annulus is and upon what the scale of the map is, the indicia may be determined arithmetically, so that the reading will be directly in terms of actual area which the map represents, for example, in acres or square miles.

One method of manufacturing a transparent flexible sheet having markings thereon similar to the sheet 11, is as follows:

A surface is prepared having concentric circles thereon similar to the sheet described above. This surface may or may not have a numerical indicia thereon. A photograph of this surface is then made upon a transparent, and preferably flexible, material, for example, a cellulosic material. This photograph may be developed directly and used as a planimeter, or it may be used as a negative to print other planimeters from. If further indicia are desired, they may be applied. A sheet so prepared has the circles thereon indelibly incorporated into the material thereof, and hence the sheet may be washed off with any suitable fluid which will not act as a solvent for the material itself.

If it is desired to have a planimeter of larger dimensions than the one just described, a photograph may be taken of the originally prepared sheet so as to give a developed enlarged negative or positive.

It is seen that the present invention provides a single substantially-flat flexible sheet adapted to be used as a planimeter. There are no relatively-moving parts and no parts to get out of order. Its simplicity makes for large-scale production and for reproduction in varying dimensions.

Friction between the planimeter and the map over which it is rotated may be reduced. In the modification shown in Fig. 2 this is accomplished by the element 14 which is fixed to the under side of the element 11 at the center of the circles 12. By means of element 14 a portion of the sheet 11 is held out of frictional contact with the underlying map. Handle means may be provided such as the knob 15. Means for anchoring the device to a map, e. g., the pin 16, may be fixed to the knob 15 and may extend through the opening 13 in the sheet 11 and through an opening in the element 14 in registry therewith. The knob 15 may be held in position by an element 17 which is fixed to sheet 11 and which forms a collar about a restricted part of the knob. The sheet 11 and elements 14 and 17 are therefore rotatable about the knob 15. The elements 14 and 17 are preferably transparent and may be of the same materials as the sheet 11, for example, glass or a cellulose composition.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A planimeter comprising a sheet of material having juxtaposed annuli marked off thereon, the outer peripheries of successive ones of said annuli setting off successive circles differing in area by a constant amount and having indicia adapted for indicating angular distances about the center of said annuli.

2. A planimeter comprising a sheet of transparent material having juxtaposed annuli marked off thereon, the outer peripheries of successive ones of said annuli setting off successive circles differing in area by a constant amount, and having indicia adapted for indicating angular distance about the center of said annuli.

3. A planimeter comprising a sheet of material having juxtaposed annuli marked off thereon, the outer peripheries of successive ones of said annuli setting off successive circles differing in area by a constant amount, and having circularly-disposed indicia adapted for indicating angular distance about the center of said annuli.

4. A planimeter comprising a sheet of transparent material having juxtaposed annuli photographically and indelibly marked off thereon, the outer peripheries of successive ones of said annuli setting off successive circles differing in area by a constant amount, and having indicia adapted for indicating angular distances about the center of said annuli.

HALE G. SMITH.